United States Patent [19]

Hayakawa et al.

[11] Patent Number: 5,013,287
[45] Date of Patent: May 7, 1991

[54] AUTOMATIC TRANSMISSION WITH STATOR SHAFT MOUNTING STRUCTURE

[75] Inventors: Youichi Hayakawa, Toyoake; Chihiro Hosono; Yasuhito Ogasawara, both of Anjo, all of Japan

[73] Assignee: Aisin Aw Co., Ltd., Anjo, Japan

[21] Appl. No.: 293,240

[22] Filed: Jan. 4, 1989

[30] Foreign Application Priority Data

Aug. 1, 1988 [JP]  Japan .................. 63-192355

[51] Int. Cl.⁵ .................. F16H 47/08; B60K 17/10
[52] U.S. Cl. .................. 475/61; 475/59
[58] Field of Search .................. 74/730, 731, 732, 733, 74/867, 688; 192/70.28; 475/31, 51, 48, 59, 60, 61, 69

[56] References Cited

U.S. PATENT DOCUMENTS

| | | | |
|---|---|---|---|
| 2,821,867 | 2/1958 | Kelbel | 74/688 |
| 2,923,178 | 2/1960 | Miller | 74/688 |
| 3,189,144 | 6/1965 | Gabriel | 475/48 X |
| 3,431,798 | 3/1969 | DiNard et al. | 475/48 X |
| 3,611,835 | 10/1971 | Borman | 74/688 X |
| 3,785,155 | 1/1974 | Upton | 60/347 |
| 4,858,500 | 8/1989 | Harada et al. | 475/61 X |

FOREIGN PATENT DOCUMENTS

| | | |
|---|---|---|
| 874604 | 8/1961 | United Kingdom . |
| 990910 | 5/1965 | United Kingdom . |
| 1487752 | 10/1977 | United Kingdom . |
| 2017835 | 10/1979 | United Kingdom . |
| 2043843 | 10/1980 | United Kingdom . |

*Primary Examiner*—Allan D. Herrmann
*Assistant Examiner*—Khoi Q. Ta
*Attorney, Agent, or Firm*—Kanesaka and Takeuchi

[57] ABSTRACT

A stator shaft is press-fitted and secured to the inner peripheral surface of a pump cover positioned between a torque converter and a automatic transmission mechanism section. Bushings are fitted to a part opposing the press-fit section with reference to the outer peripheral surface of an input shaft fabricated with a uniform diameter with the exception of the rear end part, and to a part slightly forward of the above-mentioned part, respectively, and an oil channel for the torque converter feed pressure is formed between the two bushings. As a result, the forward end section of the input shaft is supported in a freely rotatable manner by the bushings which are relatively close to each other. The torque converter feed pressure is fed from an oil channel formed in the pump cover to an oil channel between the two bushings, and through the cross hole and the center hole formed in the input shaft to the torque converter. The stator shaft is press-fitted into the pump cover and secured to it, and back-up is provided to the press-fit section by bushings.

6 Claims, 5 Drawing Sheets

| | | FIRST AUTOMATIC TRANSMISSION MECHANISM 1 | | | | | | | SECOND AUTOMATIC TRANSMISSION MECHANISM 27 | | |
|---|---|---|---|---|---|---|---|---|---|---|---|
| | | C1 | C2 | B1 | B2 | B3 | F1 | F2 | C3 | B4 | F3 |
| P R N | P | | | | | | | | | ○ | |
| | R | | ○ | | | ○ | | | | ○ | |
| | N | | | | | | | | | ○ | |
| D | 1 | ○ | | | | | | ○ | | ○ | ○ |
| | 2 | ○ | | (○) | ○ | | ○ | | | ○ | ○ |
| | 3 | ○ | | (○) | ○ | | ○ | | ○ | | |
| | 4 | ○ | ○ | | ○ | | | | ○ | | |
| 3 | 1 | ○ | | | | | | ○ | | ○ | ○ |
| | 2 | ○ | | ○ | ○ | | ○ | | | ○ | ○ |
| | 3 | ○ | | ○ | ○ | | ○ | | ○ | | |
| 2 | 1 | ○ | | | | | | ○ | | ○ | ○ |
| | 2 | ○ | | ○ | ○ | | ○ | | | ○ | ○ |
| 1 | 1 | ○ | | | | ○ | | ○ | | ○ | ○ |
| | 2 | ○ | | ○ | ○ | | ○ | | | ○ | ○ |

AUTOMATIC TRANSMISSION WITH STATOR SHAFT MOUNTING STRUCTURE

BACKGROUND OF THE INVENTION

1. Field of the Invention

The present invention relates to an automatic transmission with a fluid torque converter, and, in particular, to a support structure for an input shaft and to an oil channel structure for providing pressurized oil to a torque converter.

2. Description of the Prior Art

Figure 5:
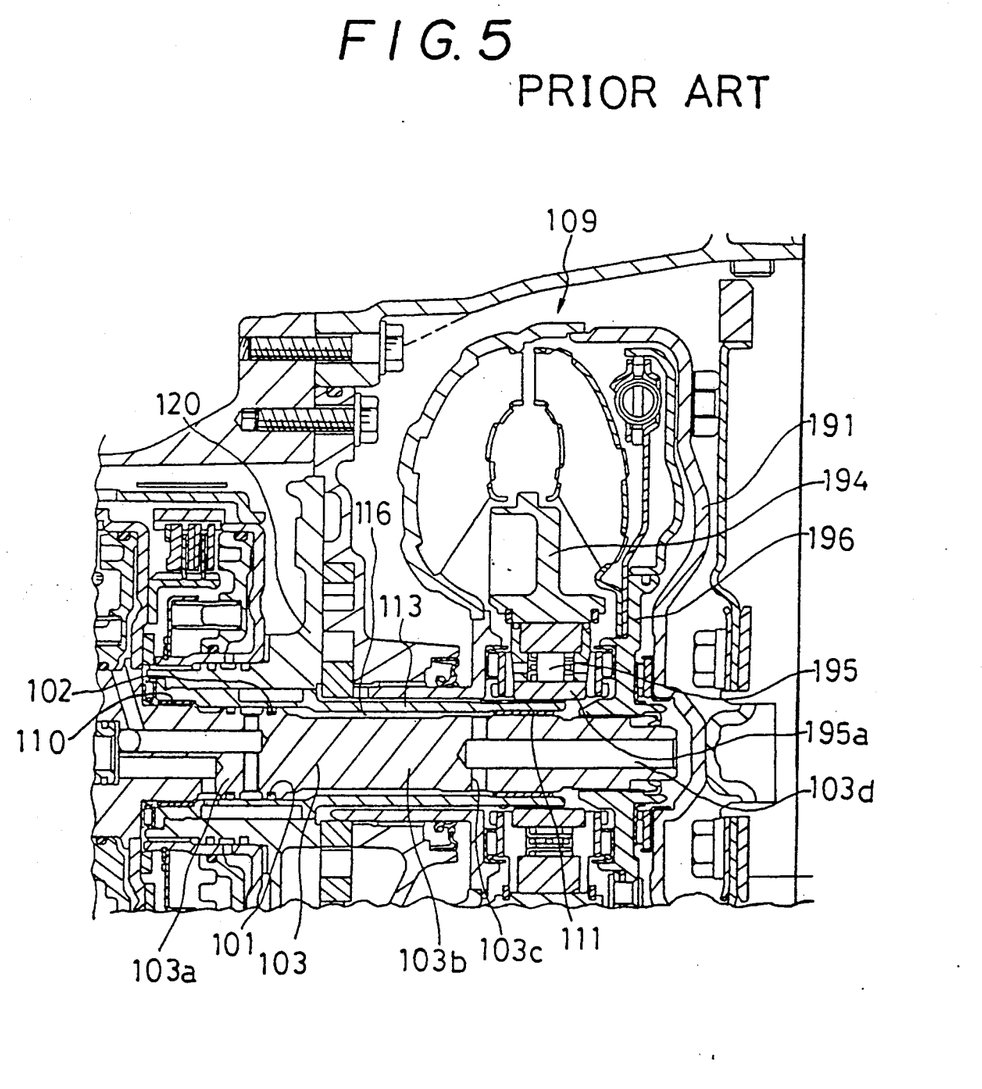
FIG. 5 is a cross sectional view of an automatic transmission constructed in the prior art.

Conventionally, front end section of an automatic transmission, as shown in FIG. 5, comprises a one-way clutch 195 which supports a stator 194 of a torque converter 109, and a stator shaft 113 secured to the inner peripheral surface of an inner race 195a of the one-way clutch. The stator shaft 113 extends toward the rear and is pressed into and secured to a pump cover 120, and bears the stator reaction. In addition, the stator shaft 113 is formed as a hollow shaft in which an input shaft 103 is free rotationally supported by means of bushings 110, 111. The input shaft 103 is formed as a stepped structure with a small diameter at the front end. An annular indented groove 101 is formed in a large diameter stepped section 103a and a seal ring 102 is installed in the groove 101. A torque converter feed pressure oil channel 116 is formed between the inner peripheral surface of the stator shaft 113 and the outer circumference of the small diameter section 103b of the input shaft between the seal ring and the front bushing 111. Also, the feed pressure in the oil channel is transmitted between a cross-hole 103d formed in the input shaft 103 and a center hole 103b, as well as between a converter front cover 191 and a turbine hub 196 and is fed into the torque converter 109.

However, in this automatic transmission, because the torque converter feed pressure oil channel 116 is formed by the seal ring 102 and the bushing 101, when the input shaft 103 is installed, scuffing of the seal ring 102 occurs, and the structure of the oil channel becomes defective. In addition, it is necessary to machine the groove 101 for the seal ring and in order to ensure the proper thickness for the groove it is necessary to provide a stepped structure for the input shaft 103. This increased machining and installation are troublesome.

The first busing 111 is positioned on the front end section and the rear bushing 110 on the rear end section of the stator shaft 103, so that the input shaft is lacking in flexibility, and excessive force applied to one bushing is a drawback from the aspect of wear. In addition, because the press-fit section where the stator shaft 103 is pressed into the pump cover 120 is not provided with back-up at the bushing, whirling of the input shaft causes the insufficient strength of the press-fit strength of the stator shaft. Especially in the case where the pump cover 120 is formed from an aluminum alloy, it may cause idling of the stator shaft 113.

SUMMARY OF THE INVENTION

An object of the present invention is to provide, with due consideration of the drawbacks of such conventional devices, an automatic transmission wherein bushings are interposed at a position opposing a press-fit section of a stator shaft and at a position slightly forward of that position respectively, and a torque converter feed pressure oil channel is formed with both bushings.

Figure 1:
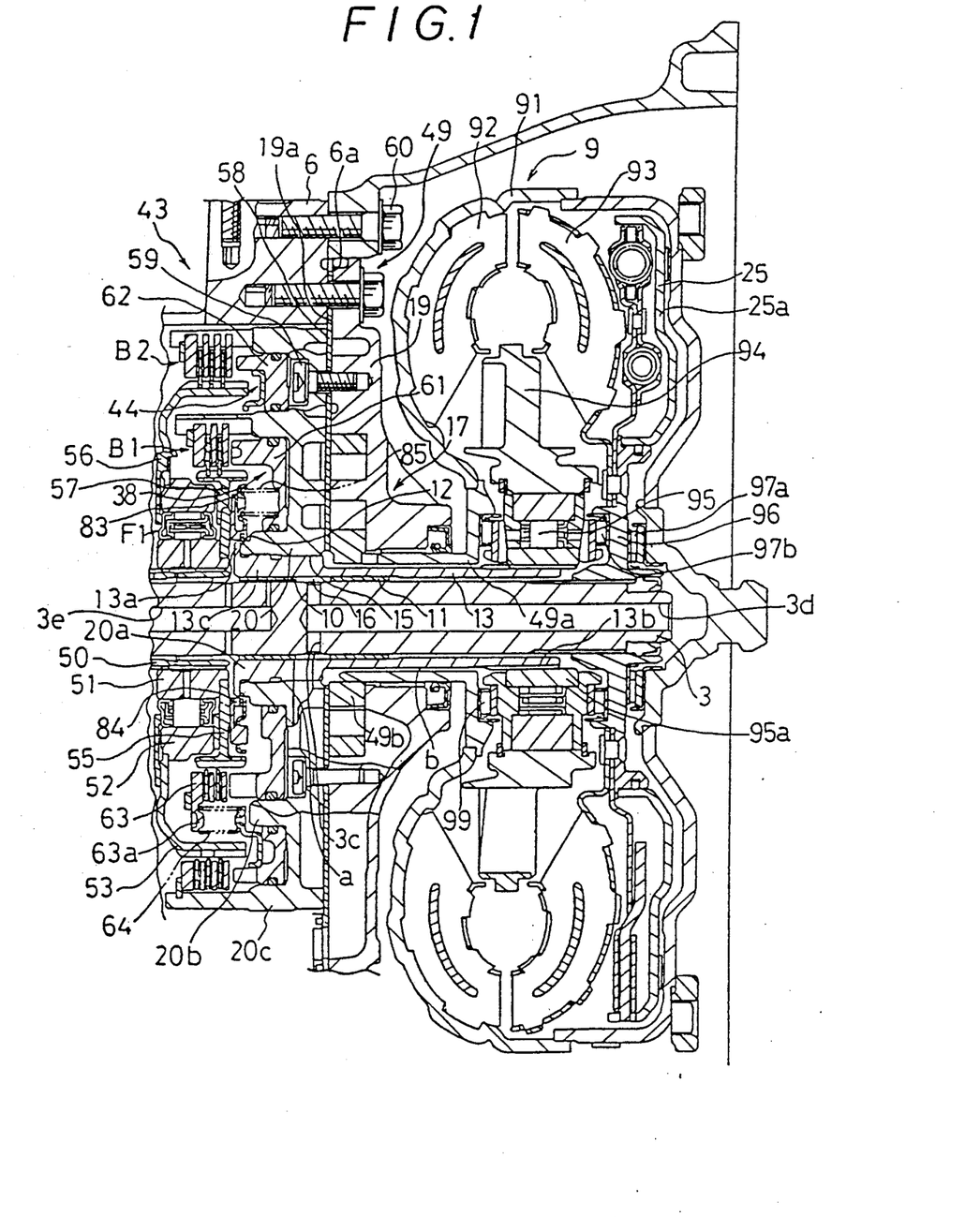
FIG. 1 is an enlarged cross-sectional view of a front section of an automatic transmission in accordance with the present invention.
Figure 2:
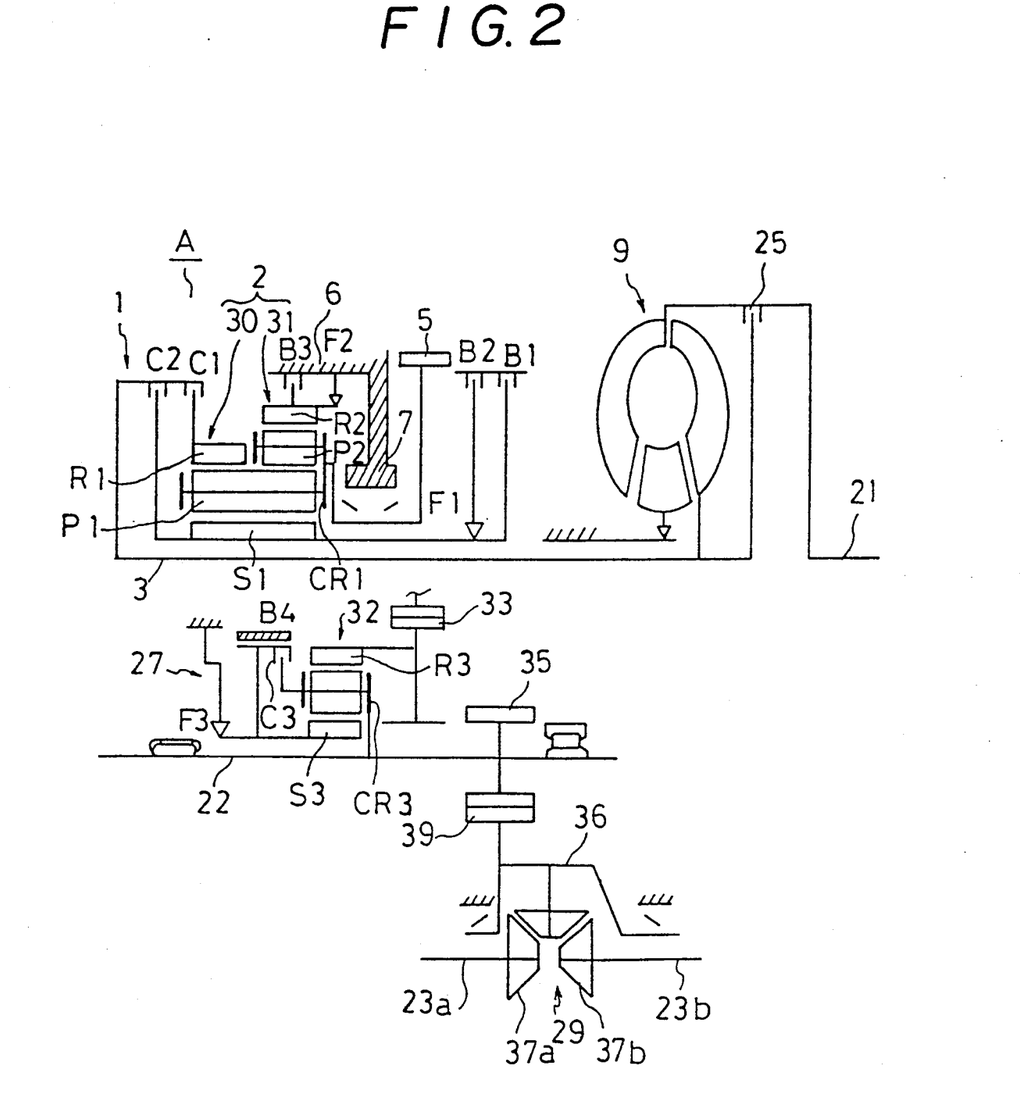
FIG. 2 is a schematic view of the automatic transmission in accordance with the present invention.

This object is achieved in the present invention by the provision of an automatic transmission comprising as shown in FIG. 1 and FIG. 2, a torque converter (9) which transmits the rotation of an engine output shaft (21) to an input shaft (3), and an automatic transmission mechanism section (1) which transmits the rotation of the input shaft (3) suitably changed, to an output member (5) and is characterized in that the stator shaft (13) which bears the stator reaction of the torque converter (9) is pressed into and secured to an inner peripheral surface (15) of a stationary member (20) positioned between the torque converter (9) and the automatic transmission mechanism section (19), that a bushing (10) and a bushing (11) are fitted to a part opposing the press-fit section (15) between the inner peripheral surface of the input shaft (3), and to a part slightly forward of the above-mentioned part respectively, and an oil channel (16) for use with the torque converter feed pressure which supplies oil to the torque converter is formed between the two bushings (10), (11).

As an example, the stationary member (20) is a pump cover of aluminum alloy which is secured to a pump body (19).

In addition, the input shaft (3) has a uniform diameter with the exception of the rear end section.

As a result of this configuration, the front end section of the input shaft (3) is free rotationally supported by the comparatively close bushings (10), (11). Also, the torque converter feed pressure is supplied to the oil channel (16) between the two bushings (10), (11) from the oil channel (a) formed in the pump cover (20) and a cross-hole (3c) and a center hole (3d) formed in the input shaft (3), and is supplied to the torque converter (9). In addition, the stator shaft (13) is press-fitted into and secured to the stationary member (20), which may be a pump cover or the like, and the press-fit section (15) is supported by the bushing (10).

Incidentally, the reference numerals in the parentheses are used only for reference with the drawings and do not limit the structure of the invention. The same number may be named differently in the following description and in the previous description in which broader concepts are adopted.

DETAILED DESCRIPTION OF THE PREFERRED EMBODIMENTS

An embodiment of the present invention will now be described with reference to the drawings.

Now referring to FIG. 2, an automatic transmission A applicable to the present invention comprises three shafts, that is an input shaft 3 aligned with an engine crank shaft 21, a counter shaft 22, and a front axle shaft formed of shafts 23a, 23b. A first automatic transmission mechanism section 1 and a torque converter 9 with a lockup clutch 25 are supported on the input shaft 3, and a second automatic transmission mechanism section 27 is supported on the counter shaft 22. A front differential device 29 is supported on the front axle shaft 23a, 23b.

The first automatic transmission mechanism section 1 comprises a planetary gear unit 2 assembled from a single planetary gear 30 and a dual planetary gear 31. In the planetary gear unit 2, two planetary gears are linked to form a common sun gear S1, and carriers are linked to form a common carrier CR1, and in addition, a long pinion P1 is engaged with the sun gear S1. The input shaft 3 and a ring gear R1 of the single planetary gear 30 are linked through a first (forward) clutch C1, and the input gear 3 and the sun gear S1 are linked through a second (reverse and direct) clutch C2. The sun gear S1 is directly engaged with and stopped by the first brake B1, and prevented from rotating in one direction by means of the second brake B2 through a first one-way clutch F1. A ring gear R2 of the dual planetary gear 31 is directly engaged with and stopped by a third brake B3, and prevented from rotating in one direction by a second one-way clutch F2. The carrier CR1 is linked to a counter drive gear 5 which is supported on a casing bulkhead. The gear 5 is an output member of the automatic transmission mechanism section 1.

The second automatic transmission mechanism section 27 has a single planetary gear 32. The sun gear S3 and a carrier CR3 of the planetary gear 32 are linked to each other through a third (direct) clutch C3. In addition, the sun gear S3 is directly engaged with and stopped by a fourth (under-drive) brake B4, and is prevented from rotating in one direction by means of a one-way clutch F3. The ring gear R3 engages the counter drive gear 5 and is linked to a counter-driven gear 33 which is the input member of the automatic transmission mechanism section 27. The carrier CR3 is linked to the counter shaft 22. A reducing gear 35 which is the output member of the automatic transmission mechanism section 27 is secured to the counter shaft 22.

The front differential device 29 comprises a differential carrier 36 and a pair of left and right sun gears 37a, 37b. A ring gear 39 is secured to a gear mounting casing which forms the differential carrier 36. The ring gear 39 engages the reducing gear 35 to complete the configuration of the speed reducing mechanism. The left and right gears 37a, 37b are linked to the left and right front axle shafts 23a, 23b respectively.

Figure 3:
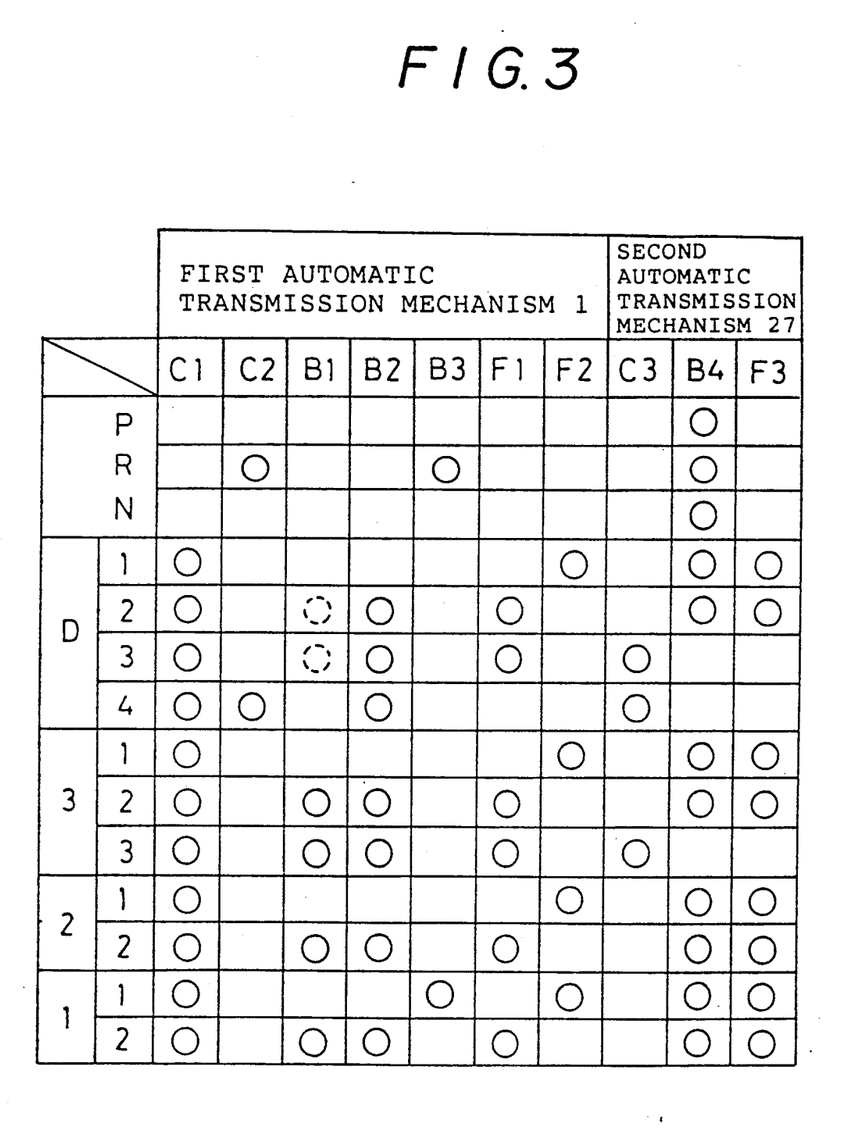
FIG. 3 is an illustration of operation in accordance with the automatic transmission of the present invention.

The operation of the automatic transmission A will now be explained with reference to FIG. 3.

The rotation of the engine crank shaft 21 is transmitted to the input shaft 3 through the torque converter 9 or the lockup clutch 25. In the first speed status in the D range, the first clutch C1 is placed in an engaged state, and the fourth brake B4 is in a stopped state. In this status, in the first automatic transmission mechanism section 1, the rotation of the input shaft 3 is transmitted to the ring gear R1 of the single planetary gear 30 through the first clutch C1, and the ring gear R2 of the dual planetary gear 31 is prevented from rotating by the second one-way clutch F2, so that while the sun gear S1 is idling in the reverse direction, the common carrier CR1 is caused to rotate at a greatly reduced speed in the forward direction, and rotation is produced through the counter drive gear 5. In the second automatic transmission mechanism section 27, the sun gear S3 is stopped by means of the fourth brake B4 and the third one-way clutch F3, so that the rotation from the counterdriven gear 33 is produced as a reduced speed rotation in the carrier CR3 from the ring gear R3. Accordingly, the first speed rotation of the first automatic transmission mechanism section 1 and the reduced speed rotation of the second automatic transmission mechanism section 27 are combined, and the rotation is transmitted to the front differential device 29 through the reducing gear 35 and the ring gear 39, and is then transmitted to the left and right front axle shafts 23a, 23b.

In the second speed status in the D range, the second brake B2 is activated in addition to the connection of the first clutch C1 and the action of the fourth brake B4. Whereupon the rotation of the sun gear S1 is halted from the action of the first one-way clutch F1 based on the brake B2. Accordingly, with the rotation of the first ring gear R1 through the input shaft 3, while the ring gear R2 of the dual planetary gear 31 is being idled in the forward direction, the carrier CR1 rotates with reduced speed in the forward direction, and the rotation is produced as the second speed in the counter drive gear 5. The second automatic transmission mechanism section 27 remains unchanged at reduced speed. The second speed of the first automatic transmission mechanism section 1 is combined with the reduced rotation of the second automatic transmission mechanism section 27, and the resulting rotation is transmitted to the front axle shaft 23a, 23b.

In the third speed status in the D range, the first automatic transmission mechanism section 1 maintains the second speed status without change. When the fourth brake B4 in the second automatic transmission mechanism section 27 is released, the third clutch C3 is placed in engagement. Whereupon the carrier CR3 and the side gear S3 become connected to each other, and the planetary gear 32 rotates as one unit to produce direct rotation in the counter shaft 22. At this time, the fourth brake B4 is released a little before the engagement of the third clutch C3 to prevent disengagement of transmission by the third one-way clutch F3. Accordingly, the second speed rotation of the first automatic transmission mechanism section 1 and the direct rotation of the second automatic transmission mechanism section 27 are combined, and the third speed is obtained as a whole in the automatic transmission A.

When shifting down to the second or third gear in the D range, the first brake B1 is also activated, so that the engine acts as a brake when coasting.

The fourth speed status in the D range is obtained from the third speed status with the second clutch C2 placed in engagement. Whereupon, rotation is transmitted to the ring gear R1 through the first clutch C1 from the input shaft 3, and to the sun gear S1 through the second clutch C2. The planetary gear unit 2 rotates integrally, and rotation is directly transmitted to the counterdriven gear 5. Then, the directly connected rotation of the first automatic transmission mechanism section 1 and the directly connected rotation of the second automatic transmission mechanism section 27 are combined. In addition, the counter drive gear 5 and the driven gear 33 are in a prescribed acceleration relationship, so that the entire automatic transmission A is subjected to overdrive rotation. At this time, in the case where the first brake B1 is activated in the second and third speeds, when an upshift is made to the fourth speed, the first brake B1 is activated a little ahead of time, so that while the sun gear S1 is being stopped by the one-way clutch F1, the second clutch C2 is engaged, and shift shock by means of interchange is prevented.

In addition, the third range is the same as the status where the first brake B1 is activated during the application of the second and third speeds in the previously mentioned D range having the first, second and third speeds.

Also, the second range is the same as the first and second speed status in the above third range.

In the first speed status in the first range, in addition to the engagement of the first clutch C1 and the action of the fourth brake B4, the third brake B3 is activated. In this status, the ring gear R2 is stopped when engaged by the second one-way clutch F2, and the third brake B3 is stopped without regard to the direction of rotation, so that the engine brake is activated. In addition, the second speed status is the same as the second speed status in the second range.

In the reverse range, the second clutch C2 is engaged, and at the same time, the third brake B3 and the fourth brake B4 are activated. In this status, the rotation of the input shaft 3 is transmitted to the sun gear S1 through the second clutch C2. Also in this status, the ring gear R2 of the dual planetary gear 31 is secured by the action of the third brake B3, so that while the ring gear R1 of the single planetary gear 30 is made to rotate in reverse, the carrier CR1 also rotates in reverse, and the reverse rotation of the carrier is produced at the counter drive gear 5. Further, the speed of the reverse rotation of the counter drive gear 5 is reduced by the second automatic transmission mechanism section 27 and is transmitted to the front axle shaft 23a and 23b.

Next, an explanation will be given relative to the automatic transmission A by means of a specific embodiment with reference to FIG. 4.

The automatic transmission A has an integral casing apparatus comprising a transaxle casing 6, a transaxle housing 41, and a rear cover 42. The input gear 3, the counter shaft 22, and the ring gear mounting casing 36 which is a differential carrier of the front differential device 29 are free rotationally supported in the casing apparatus. Then, the torque converter 9 which has a lockup clutch 25, and the first automatic transmission mechanism section 1 are positioned on the input shaft 3. The second automatic transmission mechanism section 27 is positioned on the counter shaft 22. In addition, a valve body 44 is positioned on the transaxle casing 6.

In the first automatic transmission mechanism section 1, a brake section 43, an output section 45, the planetary gear unit 2, and a clutch section 47 are arranged in order in the axial direction from the engine crank shaft 21 to the rear. An oil pump 49 is positioned between the brake 43 and the torque converter 9. A hollow shaft 50 extends over the input shaft 3 and is free rotationally supported by the input shaft 3.

The planetary gear unit 2 comprises the single planetary gear 30 and the dual planetary gear 31, as shown in FIG. 2. The single planetary gear 30 comprises the sun gear S1 formed on the hollow shaft 50, the ring gar R1, and the carrier CR1 which supports the pinion P1 which engages the ring gear R1 and the sun gear S1. The dual planetary gear 31 comprises the sun gear S1 formed on the hollow shaft 50, the ring gear R2, and the carrier CR1 which supports the first pinion P1 and the second pinion P2 in a mutually engaging manner, wherein the first pinion P1 is engaged with the sun gear s1, and the second pinion P2 is engaged with the ring gear R2. Both the planetary gears 30, 31 have commonly a single gear with the same number of teeth that is the sun gear S1 on the hollow shaft 50. The carrier CR is integrally formed and the pinion P1 is formed from an integral long pinion.

As shown in detail in FIG. 1, the first one-way clutch F1, the first brake B1 comprising a multiplate brake and the second brake B2 comprising a multiplate brake are arranged in the brake section 43 in order from the radially inner side in the radially outer direction. In the first one-way clutch F1, the tip of the hollow shaft 50 is engaged through a spline with an inner race 51, and a radially outwardly projecting hub 53 for the second brake is secured to the outer race 52. In addition, a hub 55 for the first brake is secured on the front side (engine side) of the inner race 51 of the one-way clutch F1. A ring-shaped thrust washer 56 with a claw section is mounted on the hub 53 for the second brake with the claw section engaged with an opening in the hub 53. Also, a ring-shaped thrust washer 57 is mounted on the hub 55 for the first brake. The one-way clutch F1 is situated between and held by the thrust washers 56, 57. The oil pump assembly 17 comprises an oil pump 49, a pump cover 20 made from an aluminum die-casting, a pump plate 58 inserted into the pump body 19, and a bolt 59 which integrally secures the assembly. The junction surface 19a of the body 19 is secured by the bolt 60 to the junction surface 6a of the casing 6, with the cover 20 inserted into the transaxle casing 6. On the rear side of the oil pump cover, a boss section 20a, a first collar section 20b, and a second collar section 20c are annularly and consecutively formed, protruding in the axial direction from the radially inner side. The first brake B1 is interposed between a comb-tooth shaped section of the first collar section 20b and the hub 55 for the first brake. Similarly, the second brake B2 is interposed between a comb-tooth shaped section of the second collar section 20c and the hub 53 for the second brake. In addition, a cylinder of the ring-shaped hydraulic actuator 38 for the first brake is formed between the boss section 20a and the first collar section 20b. A piston 61 is sealingly fitted into this cylinder, and a lug section of the piston 61 is extended in the axial direction to contact and activate the first brake B1. Also, a cylinder of the ring-shaped hydraulic actuator 44 used for the second brake is formed between the first collar section 20b and the second collar section 20c. A piston 62 is sealingly fitted into this cylinder, and a lug section of the piston 62 is extended in the axial direction to contact and activate the second brake B2. Further, an annular recessed section 12 notched into a step shape is formed in the tip corner section of the boss section 20a. One part of an end plate 63 of the first brake, which is retained by a snap ring in the second collar section 20c, protrudes to the outer diameter side and forms the spring receiving section 63a. A return spring 64 of the hydraulic actuator 44 for the second brake is interposed between the receiving section 63a and a lug provided at the rear surface of the piston 62.

The torque converter 9 is provided with a converter housing 91 linked to the engine crank shaft 21 (FIG. 2), and further with a pump impeller 92 and a lockup clutch 25 connected to the housing 91, a turbine impeller 93 connected to the input shaft 3, and an stator 94 positioned between the two impellers 92, 93.

The turbine hub 96 is interposed and positioned between the housing 91 and the one-way clutch 95 through the thrust bearings 97a, 97b at the front and rear surfaces of the turbine hub 96, and engaged through spline with the input shaft 3 on the inner peripheral surface of the turbine hub 96.

In addition, the converter housing 91 has a leading end to which the pump sleeve 49a is secured. The pump sleeve 49a is secured to the base of the tip of the converter housing 91. The sleeve 49a extends into the pump body 19 and has its tip secured to a pump drive gear 49b. The stator 94 is secured to the outer race of the one-way clutch 95. In addition, the inner race of the one-way clutch 95 is engaged through a spline to the stator shaft 13. The stator shaft 13 is a hollow shaft fabricated from steel. The pump sleeve 49a is positioned on the outer circumference side of the stator shaft 13, and the input shaft 3 is positioned on the inner circumference side to form a relatively freely rotatable triple shaft. One end of the stator shaft 13 forms a spline section 13b which engages the inner race 95a of the one-way clutch 95. The other end of the stator shaft 13 is bulged in a radially outward direction to form a thickened section 13c. The thickened section 13c is secured by being pressed into the center hole section 15 of the pump cover 20. Formed in this end of the stator shaft 13 is an annular flange section 13a which projects even further in the outward radial direction from the thickened section 13c for a comparatively short distance.

The inside of the flange section 13a is engaged in intimate contact with the outside surface of the pump cover 20. The snap ring groove is defined by the flange section 13a and the annular recessed section 12 of the corner section of the pump cover. The spring receiving member 83 and the snap ring 84 are installed in the snap ring groove. The snap ring 84 supports the receiving member 83 to prevent it from being ejected. The return spring 85 is fitted by compression between the receiving member 83 and the rear surface of the piston 61 of the first hydraulic actuator 11.

The input shaft 3 has a uniform diameter except for the rear end position thereof. The leading edge portion thereof is rotatably supported by the bushings 10, 11 arranged with a relatively small space therebetween. The rear bushing has a groove on the inner peripheral surface, and is positioned at a part opposing to the press-fit section 15 of the stator shaft 13. The front bushing 11 is spaced apart from the rear bushing 10 and slightly forward of the rear bushing 10. The bushings 10, 11 are fitted into the inner peripheral surface of the stator shaft 13 or onto the outer peripheral surface of the input shaft 3. The intermediate section 16 between the bushings 10, 11 is communicated with the supply oil channel formed in the pump cover for torque converter feed pressure upon lockup clutch OFF, and communicated with the cross hole 3c formed in the input shaft 3, thereby forming the oil channel for feed pressure. The oil channel 16 is communicated with the leading end section of the torque converter housing 91 through the cross hole 3c and the center hole 3d formed in the end portion of the input shaft 3. The leading end portion of the housing 91 is communicated with the torus comprising a turbine impeller 93 and a pump impeller 92 through the thrust bearing 97a between the turbine bub 96 and the front surface of the plate 25a of the lock-up clutch 25. The gap portion b between the pump sleeve 49a and the stator shaft 13 is a feed pressure oil channel at lockup clutch ON, and the oil channel b is communicated with the torus through the bearing 99 between the one-way clutch 95 and the rear face of the housing.

Figure 4:
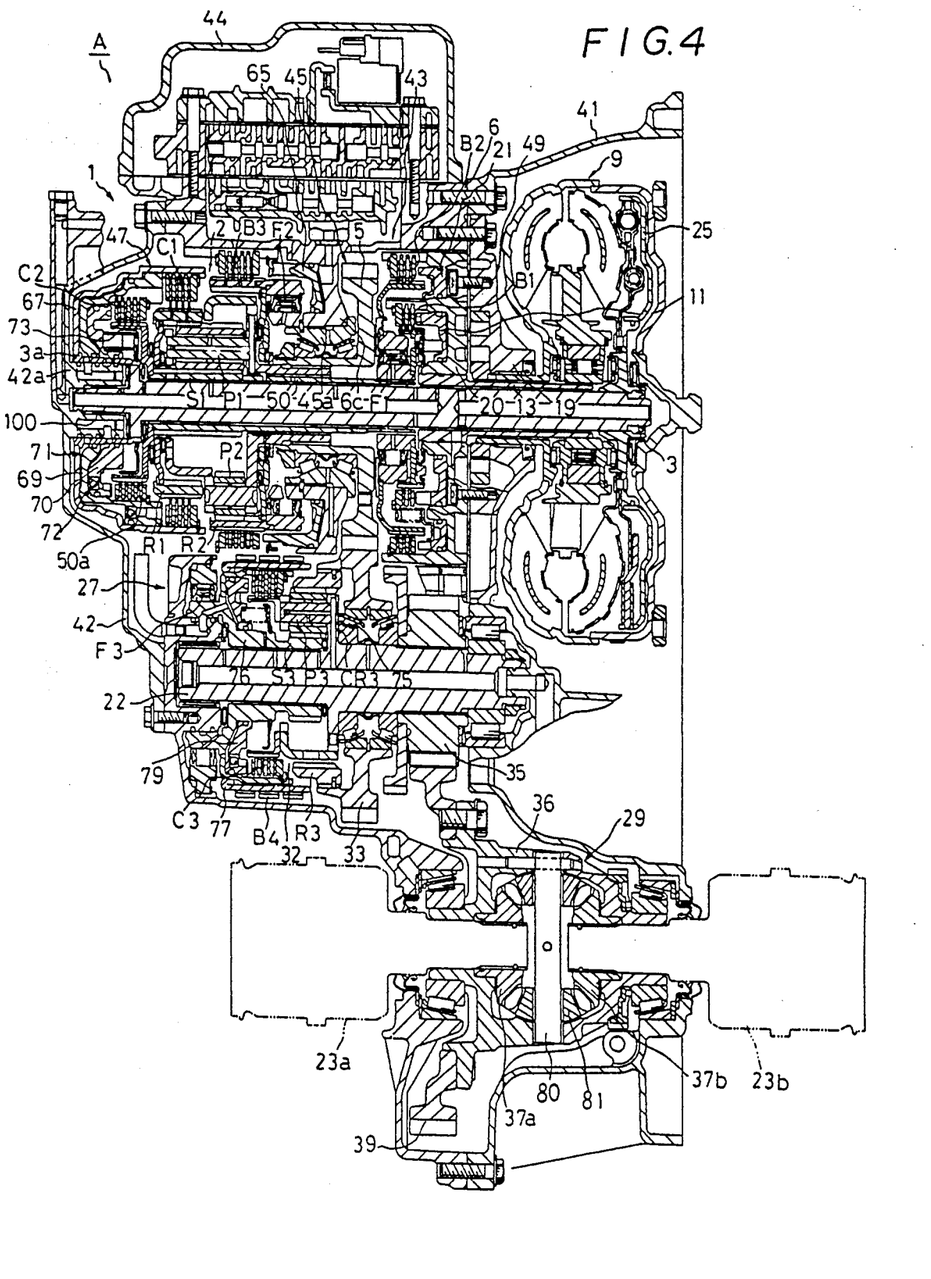
FIG. 4 is a cross sectional view generally showing the automatic transmission of the present invention.

The output section 45 has a counter-drive gear 5 which, as shown in FIG. 4, is positioned at almost dead center of the first automatic transmission mechanism section 1. The counter drive gear 5 is free rotationally supported on the bulkhead 6c formed in the transaxle casing 6 through a double tapered bearing 45a. The counter drive gear 5 has a boss section which is connected to the carrier CR1 of the planetary gear unit 2. The outer race of the bearing 45a is engaged by a spline to the inner peripheral surface of the casing bulkhead 6c, and the second one-way clutch F2 is mounted on the outer peripheral surface of the race extension section.

The outer race of the second one-way clutch F2 is secured to the ring gear R2 of the dual planetary gear 31, and the ring gear R2 is supported in the axial direction by a support plate which is interposed between the counter gear boss section and the carrier CR1 through a thrust bearing. Accordingly, the second one-way gear F2 is juxtaposed in the axial direction between the planetary gear unit 3 and the casing bulkhead 6c. In addition, the third brake B3 is interposed between the outer periphery of the ring gear R2 and the axle casing 6, and a cylinder is formed on one side of the surface section of the bulkhead 6c. In addition, the hydraulic actuator 65 formed by a piston is interposedly positioned between the one-way clutch F2 and the cylinder. Further, the hydraulic actuator 65 is provided with a cylindrical, comb-tooth shaped arm. This arm extends in the axial direction through the radially outer side of the second one-way clutch F2, so that a return spring is arranged in the comb-tooth section and the third brake B3 is controlled.

The clutch section 47 is provided with the first (forward) clutch C1 and the second (direct) clutch C2 and is positioned at the rear edge of the first automatic transmission mechanism section 1 and housed in the rear cover 42. In addition, the rear edge section of the input shaft 3 forms the sleeve section 3a by which the boss section 42a of the cover 42 is engaged. In addition, a clutch drum 67 is integrally linked to the sleeve section 3a. A movable member 69 is engaged to freely slide only in the axial direction on the clutch drum 67 by means of a spline. A piston member 70 is fitted with the movable member 69. In addition, the movable member 69 defines an oil chamber cooperating with the cylinder which is formed from the inner peripheral surface of the clutch drum 67, thereby forming a hydraulic actuator 71 for use with the first clutch C1. A piston member 70 defines an oil chamber cooperating with the cylinder formed from the inner peripheral surface of the movable member 69, thereby forming a hydraulic actuator 72 for use with the second clutch C2. Set between the piston member 70 and the snap ring secured to the sleeve 3a is a snap ring 73 which is compressed through a receiving member. The snap ring 73 forms a return spring which is common to the piston members 69, 70 of the hydraulic actuators 71, 72. In addition, the first clutch C1 is interposed between the spline formed on the inner peripheral surface of the radially outer section of the clutch drum 67 and the spline formed on the inner peripheral surface of the ring gear R1. The second clutch C2 is interposed between the spline formed on the inner peripheral surface of the radially outer section of the movable section 69 and the spline formed on the outer peripheral surface of the hub section 50a secured to the hollow shaft 50.

The second automatic transmission mechanism section 27 is provided with one single planetary gear 32.

Also, the counter driven gear 33 is free rotationally supported on the counter shaft 22 through a bearing 75, and the reducing gear 35 is secured to the counter shaft 22. The ring gear R3 of the planetary gear 32 is linked to the counterdriven gear 33. The carrier CR3 which supports the pinion P3 is integrally formed by expansion in the radially outer direction of the counter shaft 22. The sun gear S3 is formed on a hub 76 which is free rotationally supported on the shaft 22. A drum 77 secured to the radially outer section of the hub is engaged on its outer peripheral surface by the fourth brake B4 which is a hand brake. The third clutch C3 is interposed between the inner peripheral surface of the drum 77 and the hub secured to the carrier CR3. A piston engages the hub 76 adjacent to the clutch C3 and forms a hydraulic actuator for the clutch C3. The third one-way clutch F3 is interposed between the elongated section of the hub 76 and the casing 6.

The front differential device 29 is provided with the ring gear mounting casing 36 which forms a differential carrier. The casing 36 is free rotationally supported on the housing 41 and casing 6 through a bearing. The large diameter ring gear 39 which engages the reducing gear 35 is secured to the mounting casing 36. In its inner section, a pinion gear 81 is free rotationally supported by a pinion shaft 80, and the right and left side gears 37a, 37b which engage the gear 81 are free rotationally supported. A pair of right and left front axle shafts 23a, 23b are respectively engaged and linked by the side gears 37a, 37b.

Next, the action of the automatic transmission A will be explained.

The rotation of the engine crank shaft 21 is transmitted to the housing 91 of the torque converter 9. The oil flow activates a turbine impeller 93 by means of a pump impeller 92 and then returns to the pump impeller 92 via the stator 94. At this time, a torque acts on the stator 94 and a torque differential is produced between the rotors of the pump and the turbine. However, the reaction of the torque which acts on the stator 94 is transmitted to the stator shaft 13 through a one-way clutch 95, and is borne on the pump cover 20 which is fittingly engaged by the shaft 13. When the oil flow from the turbine impeller 93 acts on the rear surface of the stator 94, the stator 94 idles from the action of the one-way clutch 95. The rotation of the turbine impeller and the lock-up clutch 25 is transmitted to the input shaft 3. The rotation of the housing 91 is transmitted to the drive gear 49b through the pump sleeve 49a to drive the oil pump 49.

The input shaft 3 is supported by the inner peripheral surface of the stator shaft 13 through the bushings 10, 11 which are separated from each other by a relatively short distance. The rear end of the input shaft 3 is also supported in a rear cover boss section 42a through a needle bearing 100. In addition, as previously explained, the stator reaction is borne by the stator shaft 13 and the press fit section 15 of the pump cover 20. However, the rear bushing 10 and the input shaft 3 are positioned on the inner peripheral surface of the stator shaft of the pres-fit section 15. Also, the pump cover 20 is formed from an aluminum alloy, so the press-fit section 15 does not come loose as a result of the whirling or the like of the input shaft 3. In addition, lubricant is supplied to the rear bushing 10 at the inner peripheral surface thereof in which the groove is formed by a lubrication hole 3c formed on the input shaft 3 through the medium of a cross hole, and the input shaft 3 is supported in an adequately lubricated state.

In addition, when a lock-up clutch 25 is OFF, feed pressure from a lock-up control valve (omitted from the drawings) is transmitted through the oil channel a, and is supplied to the oil channel 16 between the two bushings 10, 11. In addition, the front end section of a torque converter housing 91 is supplied with oil through the cross-hole 3c and the center hole 3d. As a result, the feed pressure passes to the front surface of a clutch plate 25a through a thrust bearing 97 and is supplied to a torque converter main bodies 92, 93, 94, while the lock-up clutch 25 is maintained in the released state. The oil then passes from the main body through a thrust bearing 99 in the rear direction and is discharged into the oil channel b and subsequently discharged through the lock-up control valve. When the lock-up clutch is ON, the feed pressure from the lock-up control valve passes through the oil channel b and the thrust bearing 99 and is supplied to the main body of the torque converter, specifically to the rear side of the lock-up clutch 25 for connection of the lock-up clutch 25. The oil then passes through the thrust bearing 97a, the center hole 3d, the cross hole 3c, and the oil channel 16 between the two bushings, and then passes through the oil channel and is discharged through the lock-up control valve.

In the abovementioned embodiment of the present invention, the explanation was given to the automatic transmission A comprising the first automatic transmission mechanism section 1 with the forward third speed and the second automatic transmission mechanism section 27 with the direct speed and reduced speed switching. However, this is not restrictive to the present invention. As revealed in Japanese Laid Open Patent No. SHO-62-141342, an automatic transmission using four forward speeds of an automatic transmission mechanism section, or other automatic transmissions can, of course, be applied.

TECHNICAL ADVANTAGES OF THE INVENTION

As explained above, by means of the present invention, because the torque converter feed pressure oil channel (16) is formed by the two bushings (10), (11) which supports the input shaft (3), it is unnecessary to use a seal ring, and a defective structure in the oil channel due to scuffing or the like is prevented. Therefore, the reliability is improved and machining of the groove for a seal ring is not necessary. In addition, installation is also simplified and the cost can be reduced.

In addition, because the rear bushing (10) is positioned so that it opposes the press-fit section (15) of the stator shaft (13), it backs up the press-fit section and the whirling of the input shaft (3) at the press-fit section is prevented, so it is possible to prevent idling of the stator shaft (13) caused by loosening of the press fit section (15). It therefore becomes possible to fabricate the pump cover (20), that is the stationary member, of aluminum alloy, which provides a lighter automatic transmission (A).

In addition, because the front bushing (11) is positioned close to the rear bushing (10), the support of the front end of the input shaft (3) is made flexible so that it is prevented from occurring that only one bushing is subjected to wearing, which improves the durability of the bushing.

It also becomes unnecessary to form a groove or the like in the input shaft (3) for a seal ring. As a result, the input shaft can be formed with a uniform diameter except at the rear end, making it easy to insert the input shaft (3), and it is possible to fabricate the first shaft with a single shaft. The bushings (10), (11) can then be inserted from the same direction and the assembly of the automatic transmission (A) can be made extremely easy.

What is claimed is:

1. An automatic transmission comprising, an input shaft, a torque converter for transmitting rotation from an engine to the input shaft, said torque converter having a pump impeller, a turbine impeller connected to the input shaft, and a stator, an oil pump assembly arranged adjacent to the torque converter and adapted to be fixed to a stationary casing of the automatic transmission, said oil pump assembly having an inner radial peripheral surface, said input shaft extending inside the inner radial peripheral surface.

a stator shaft situated over the input shaft, connected to the stator and secured under pressure in the inner peripheral surface of the oil pump assembly to bear stator reaction force, a first bushing situated between the stator shaft and input shaft and located radially inwardly within an axial extent of the inner peripheral surface of the oil pump assembly to support the stator shaft and the inner peripheral surface of the oil pump assembly, a second bushing situated between the stator shaft and input shaft adjacent the first bushing to form a space between the first and second bushings, said second bushing being located radially inwardly within an axial extent of the oil pump, said first and second bushings rotationally supporting the input shaft near one end thereof to prevent whirling of the input shaft, and an oil channel formed by the space between the first and second bushings and communicating with torque converter to supply oil thereto through the space between the first and second bushings.

2. An automatic transmission according to claim 1, further comprising a one-way clutch installed inside the stator to prevent rotation of the stator in one direction and having an inner race engaging the stator shaft.

3. An automatic transmission according to claim 1, wherein said pump assembly is formed of a pump body and a pump cover secured to the pump body, said pump cover having the inner peripheral surface to which said stator shaft is secured.

4. An automatic transmission according to claim 1, wherein said input shaft has a rear end at an opposite side of the torque convertor, said input shaft having a uniform diameter except the rear end.

5. An automatic transmission according to claim 1, wherein said input shaft has a central hole communicating with the oil channel between the first and second bushings.

6. An automatic transmission comprising, an input shaft, a torque converter for transmitting rotation from an engine to the input shaft, said torque converter having a pump impeller, a turbine impeller connected to the input shaft, and a stator, an oil pump assembly arranged adjacent to the torque converter and adapted to be fixed to a stationary casing of the automatic transmission, said oil pump assembly including a pump body and a pump cover secured to the pump body, said pump cover including a boss section with an inner radial peripheral surface, a first collar section and a second collar section, which are radially spaced apart from each other and extend away from the torque converter, a cylinder for a first brake and a cylinder for a second brake, said cylinder for the first brake being formed between the boss section and first collar section and said cylinder for the second brake being formed between the first and second collar sections, a stator shaft situated over the input shaft, connected to the stator and secured under pressure in the inner peripheral surface of the boss section of the pump cover to bear stator reaction force, a first bushing situated between the stator shaft and input shaft and located radially inwardly within an axial extent of the inner peripheral surface of the oil pump to support the stator shaft and the inner peripheral surface of the oil pump assembly, a second bushing situated between the stator shaft and input shaft adjacent the first bushing and located radially inwardly within an axial extent of the oil pump, said first and second bushings rotationally supporting the input shaft to prevent whirling of the input shaft, and an oil channel situated between the first and second bushings and communicating with torque converter to supply oil to the first and second bushings.

* * * * *